US012779880B2

(12) United States Patent

Murali et al.

(10) Patent No.: US 12,779,880 B2
(45) Date of Patent: Nov. 3, 2026

(54) METHOD FOR APPLYING AN IMAGE ONTO A RECORDING MEDIUM, SCANNING PRINTER AND SOFTWARE PRODUCT

(71) Applicant: Canon Production Printing Holding B.V., Venlo (NL)

(72) Inventors: Vignesh Murali, Venlo (NL); Tim R. Frijnts, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 126 days.

(21) Appl. No.: 18/787,661

(22) Filed: Jul. 29, 2024

(65) Prior Publication Data

US 2025/0074077 A1 Mar. 6, 2025

(30) Foreign Application Priority Data

Aug. 3, 2023 (EP) .................................... 23189448

(51) Int. Cl.
*B41J 11/00* (2006.01)

(52) U.S. Cl.
CPC .... *B41J 11/00214* (2021.01); *B41J 11/00212* (2021.01)

(58) Field of Classification Search
CPC ................................................. B41J 11/00218
See application file for complete search history.

(56) References Cited

U.S. PATENT DOCUMENTS

2004/0141040 A1 7/2004 Nakajima
2009/0244230 A1 10/2009 Ohnishi et al.
2012/0281049 A1* 11/2012 Kachi ................ B41J 11/00214 347/102
2015/0231892 A1* 8/2015 Mochizuki ......... B41J 11/00218 347/12
2017/0036459 A1* 2/2017 Ohara .................. B41M 7/0081
2018/0281310 A1 10/2018 LeFevre et al.
2019/0134995 A1* 5/2019 Rietbergen ......... B41J 11/00212
2021/0031541 A1 2/2021 Mezaki
2023/0415496 A1* 12/2023 Tokai ................. B41J 11/00214

FOREIGN PATENT DOCUMENTS

EP 3 412 471 A1 12/2018

OTHER PUBLICATIONS

Search Report issued in European priority application 23189448, dated Dec. 19, 2023.

* cited by examiner

*Primary Examiner* — Scott A Richmond
(74) *Attorney, Agent, or Firm* — Birch, Stewart, Kolasch & Birch, LLP

(57) ABSTRACT

The present invention relates to a method for applying an image onto a receiving medium, wherein the image is applied onto the recording medium by depositing a UV-curable ink and the ink is irradiated with radiation. The present invention further relates to a scanning printer and a software product.

15 Claims, 10 Drawing Sheets

Fig. 3
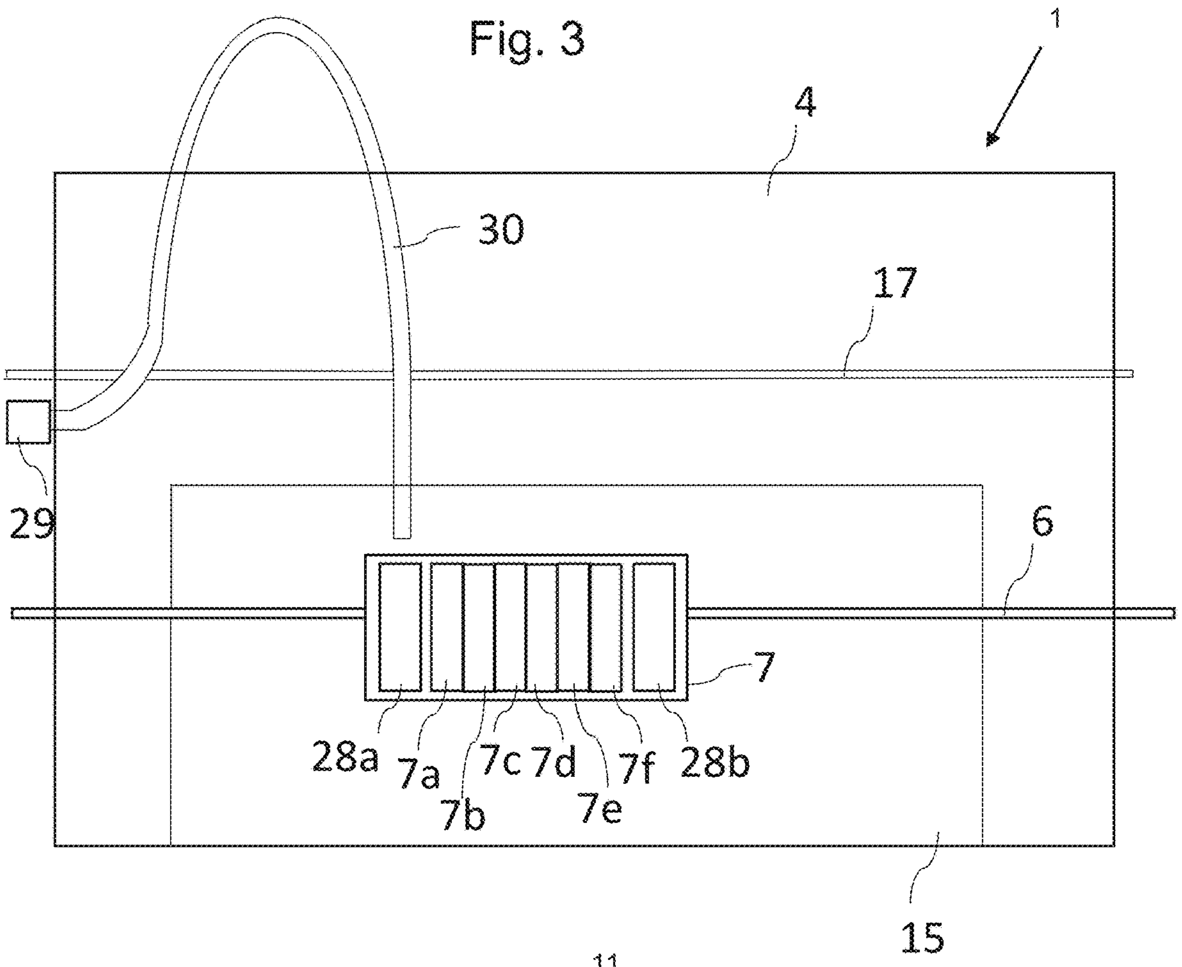
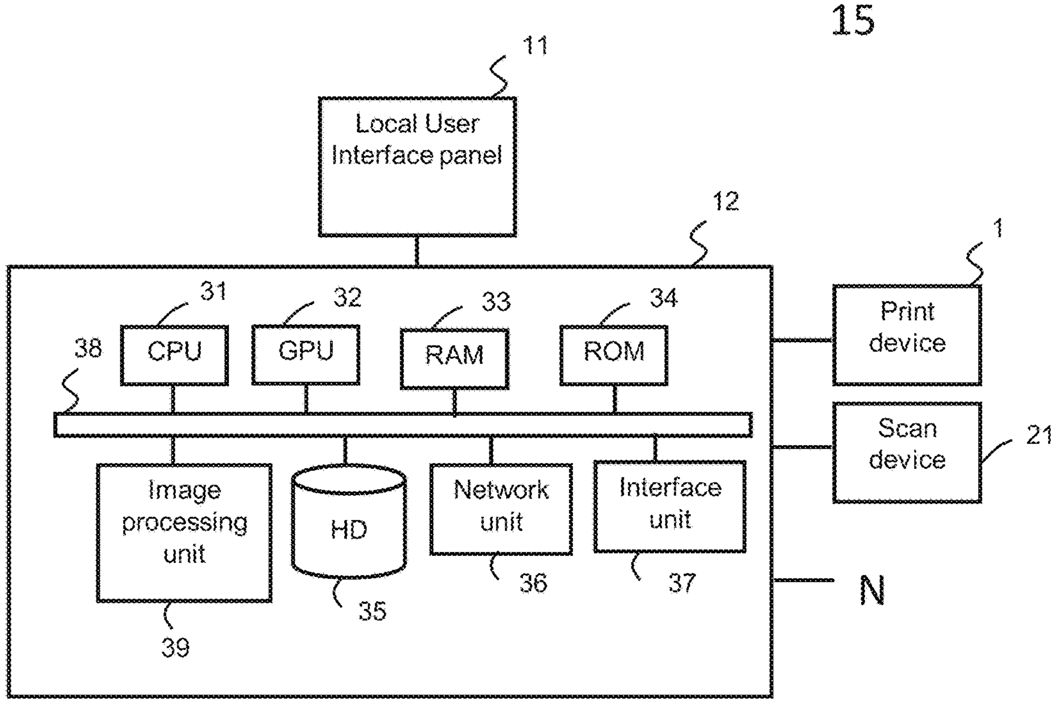
Fig. 4

METHOD FOR APPLYING AN IMAGE ONTO A RECORDING MEDIUM, SCANNING PRINTER AND SOFTWARE PRODUCT

The present invention relates to a method for applying an image onto a receiving medium, wherein the image is applied onto the recording medium by depositing a UV-curable ink and the ink is irradiated with radiation. The present invention further relates to a scanning printer and a software product.

BACKGROUND OF THE INVENTION

Methods for operating a printing apparatus using a radiation-curable ink are known in the art. Generally, such methods comprise the step of applying the radiation-curable ink onto a recording medium, e.g. by jetting droplets of the ink using an ink jet printer. After the ink has been applied onto the recording medium, the ink is hardened by irradiating the ink using a curing unit configured to in operation emit a suitable source of radiation, such as UV radiation. The source of radiation may be comprised in a curing unit.

Printing apparatuses include scanning printers as well as single pass printers. Scanning printers typically comprise a scanning print unit, which in printing operation moves in reciprocation in a main scanning direction. Preferably, a scanning printer prints bidirectionally, i.e. ink is applied both in a forward movement in the main scanning direction and in a backward movement in the main scanning direction. To obtain good print quality, the print unit typically travels over a certain area of the recording medium more than once. This is called multi-pass printing. Each pass, the ink may receive radiation to (partially) cure the ink. The time interval between a first passage of the print unit and second passage of the print unit may differ among the main scanning direction. This time interval may influence the visual appearance of the printed image. Consequently, there may be differences in visual appearance between different parts of the print. This phenomenon is called zebra-banding. The occurrence of zebra-banding is unwanted.

Therefore a need exists for a method of printing wherein prints are prepared showing no or reduced zebra-banding.

It is therefore an object of the present invention to provide a method of applying an image onto a recording medium wherein prints are prepared showing no or little zebra-banding. It is a further object of the invention to provide a scanning printer that enables preparing prints showing no or little zebra-banding.

SUMMARY OF THE INVENTION

The object of the invention is achieved in a method for applying an image onto a recording medium using a scanning printer, the scanning printer comprising at least one scanning print unit configured to in printing operation move in reciprocation in a scanning direction, the scanning printer further comprises a curing unit, the curing unit being configured to in operation provide radiation for irradiating the ink, wherein the method comprising the steps of:

- applying a predetermined pattern of a radiation-curable ink onto the recording medium;
- irradiating the ink applied onto the recording medium using the curing unit, wherein the output of the curing unit is controlled based on a time interval between a first passage of the print unit and a second passage of the print unit, wherein the output is controlled according to a predetermined output profile, wherein the output is varied from a non-zero minimum output to a maximum output and wherein the output is higher if the time interval is shorter and the output is lower if the time interval is longer.

The method may be performed using a scanning printer. A printer is also referred to as printing apparatus. The printer may be configured to in printing operation apply a radiation-curable ink. The radiation-curable ink may be a UV-curable ink, for example a UV gel ink. Suitable types of radiation-curable inkjet inks including UV-curable inkjet inks are known in the art. Preferably, the printer may be an inkjet printer, configured to apply ink onto the recording medium by jetting droplets of ink onto the recording medium in a predetermined pattern to form an image.

The scanning printer comprises at least one scanning print unit. The print unit may be configured to in operation move in reciprocation in a scanning direction. The print unit may be further configured to in operation deposit a predetermined pattern of a UV-curable ink on a recording medium. The method according to the present invention comprises the step of applying a predetermined pattern of a radiation-curable ink onto the recording medium.

The print unit may comprise at least one inkjet print head configured to in operation jet ink onto the recording medium. The print head may be for example a thermal inkjet print head or a piezo electric inkjet print head. The printer may comprise a plurality of inkjet print heads. One type or color of ink may be used to form the image, but alternatively more than one type and/or color of ink may be used. A Cyan, a Magenta, a Yellow and a black ink may be used to form the image. In addition, one or more of a white ink, brown ink, grey ink, light magenta, light cyan, red, green, orange, purple ink may be used. Further, one or more of a primer composition, an overcoat composition and a metallic ink may be used. The scanning print unit is configured to in operation move in reciprocation in a scanning direction. The scanning direction is also referred to as main scanning direction. The scanning direction may be perpendicular to a medium transport direction.

The printing apparatus may further comprise a medium support. The medium support may be configured to in operation support the recording medium. Optionally, the recording medium may be moved in a medium transport direction. The medium support may comprise a flat table. Optionally, the medium support may comprise an endless belt. The medium support may comprise holes for applying an underpressure. Applying an underpressure may fix the recording medium to the medium support.

Optionally, the printing apparatus may comprise medium transport unit. The medium transport unit may be configured to in operation move the recording medium relative to the printer in the medium transport direction. The medium transport may be configured to move web-based media, rigid media or both.

The printing apparatus further comprises a curing unit. The curing unit is configured to in operation provide radiation for irradiating at least part of the recording medium provided with a radiation-curable ink. By irradiating the radiation-curable ink, a chemical reaction may occur in the radiation-curable ink, which may result in curing or pre-curing of the fluid. The scanning curing unit may comprise at least one source of radiation. The source of radiation may be a laser or a lamp, such as a LED lamp, a UV arc lamp, a mercury vapor lamps or metal halide bulbs. The source of radiation may in operation provide radiation, preferably UV radiation. The radiation may be provided directly onto the recording medium. Alternatively, the radiation emitted by the source of radiation may be directed to the recording medium by an optical element. Non-limiting examples of optical elements include lenses, mirrors and optical fibers.

In printing operation, the recording medium may move with respect to the scanning print unit. The relative movement may be effected by moving at least one of the recording medium and print unit. The direction of relative movement of the print unit and the recording medium is the relative recording medium transport direction.

The method according to the present invention includes the step of "applying a predetermined pattern of a radiation-curable ink onto the recording medium". The pattern of ink may be applied onto the recording medium by applying a plurality of droplets onto the recording medium. The droplets may be applied using the print unit.

The method according to the present invention further includes the step of "irradiating the ink applied onto the recording medium using the curing unit, wherein the output of the curing unit is controlled based on a time interval between a first passage of the print unit and a second passage of the print unit, wherein the output is controlled according to a predetermined output profile, wherein the output is varied from a non-zero minimum output to a maximum output and wherein the output is higher if the time interval is shorter and the output is lower if the time interval is longer". In this step, the ink applied onto the recording medium is irradiated with suitable radiation to cure the ink. The curing of the ink may be a partial curing, also known as pinning or alternatively, the ink may be fully cured. The curing unit may provide an output. The output of the curing unit may comprise radiation of a certain wavelength or wavelength distribution. The radiation may have a certain intensity. The output of the curing unit may not be constant during printing operation, but may vary in time with respect to at least one property, such as intensity.

In the method according to the present invention, the output of the curing unit is controlled based on a time interval between a first passage of the print unit and a second passage of the print unit. The print unit may move in reciprocation in a main scanning direction during printing. The print unit may move in reciprocation between a first side edge and a second side edge. During the scanning movements, the print unit may move alternately from the first side edge to the second side edge and from the second side edge back to the first side edge. In a first scanning movement, the print unit may move from the first side edge to the second side edge. In a second scanning movement, the print unit may move from the second side edge to the first side edge. In a third scanning movement, the print unit may move from the first side edge to the second side edge, etc. The first, second, third, etc scanning movements may be referred to as single scanning movements.

During the scanning movements, ink may be deposited onto the recording medium. When the print unit moves from the first side edge to the second side edge and deposits ink at a position close to the first side edge and remote from the second side edge during a first passage of the print unit, the time interval between the first passage of the print unit and the second passage of the print unit may be relatively long. When the print unit moves from the first side edge to the second side edge and deposits ink at a position remote from the first side edge and close to the second side edge during a first passage of the print unit, the time interval between the first passage of the print unit and the second passage of the print unit may be relatively short. Hence, the time interval between the first passage of the print unit and the second passage of the print unit may differ for different positions on the recording medium. In the method according to the present invention, the output of the curing unit is controlled based on a time interval between a first passage of the print unit and a second passage of the print unit. Hence, the output of the curing unit may be different for different positions on the recording medium. In the method according to the present invention, the output is higher if the time interval is shorter and the output is lower if the time interval is longer. The first passage may be a present passage of the print unit. The second passage may be the subsequent passage of the print unit.

The output of the curing unit is controlled according to a predetermined output profile. The output profile may define the relation between the output of the curing unit and the time interval between a first passage of the print unit and a second passage of the print unit. Optionally, the output profile may be based on further parameters, such as type of recording medium, type of ink, print mode, including the number of passes of the print unit. Optionally, there may be a plurality of output profiles. One of the plurality of output profiles may be selected for a certain print job. The profile may be automatically selected by the control unit of the printer, or may be selected by an operator of the printer. The plurality of output profiles may be stored on storage means accessible by the control unit of the printer.

According to the output profile, the output is varied from a non-zero minimum output to a maximum output. The minimum output and the maximum output may be suitably selected. If there is more than one output profile, optionally at least one of the minimum output and maximum output may differ between two different output profiles. The output may be varied during a scanning movement. Preferably, the output may be varied during a single scanning movement. Hence, the output of the curing unit may be varied when the print unit moves from a first position to a second position, in the main scanning area. Consequently, in a single scanning movement, the output of the curing unit when the print unit is at the first position may be different from the output of the curing unit when the print unit is at the second position.

It was surprisingly found that controlling the output of the curing unit according to the present invention may strongly reduce the occurrence of zebra-banding, thereby improving the image quality of a printed image.

In an embodiment, the radiation-curable ink is a radiation-curable phase change ink. Radiation curable phase change inks are a special class of radiation-curable inks. These inks are fluid at elevated temperature and become solid—even if not yet cured—at lower temperatures. These inks are typically jetted at elevated temperatures. Radiation-curable phase change inks may become solid or semi-solid upon cooling down on a recording medium, e.g. a sheet of paper. As a result, spread of a droplet of ink on the recording medium may be decreased and color bleeding may be prevented.

An example of a radiation-curable phase change ink is a radiation-curable gelling inkjet ink. Such ink may be jetted at elevated temperature and may undergo a rapid increase in viscosity when being jetted onto a recording medium. Because of the increase in viscosity, the droplets of ink jetted onto the recording medium may not spread much and hence, color bleeding may be prevented even if the ink composition is not immediately cured after being applied onto the recording medium. The gelling behavior may be provided by adding a suitable gellant to the ink composition.

When using a radiation-curable gelling ink, it may be possible to allow a time interval between applying the ink onto the recording medium and irradiating the ink. Hence, it may be more easy to control the timing of the irradiation step. Further, using a gelling UV-curable ink may enable to apply a plurality of layers before the ink is fully cured.

In an embodiment, the curing unit is configured to in operation provide a scanning beam of radiation. The beam of radiation may move over the recording medium in a scanning direction. During the scanning movement, at a first moment in time a first area of the recording medium may be irradiated and a second area of the recording medium may not be irradiated. At a second moment in time, the second area of the recording medium may be irradiated and the first area of the recording medium may not be irradiated.

The scanning movement of the beam may follow the scanning movement of the print unit. Preferably, there is a certain time delay between a passage of the print unit and the passage of the beam of radiation.

The scanning beam may be generated by a scanning curing unit, i.e. a curing unit being configured to in printing operation move in reciprocation in a scanning direction. Alternatively, the scanning beam may be generated using a source of radiation positioned in a fixed position with regard to a frame of the printer and a scanning optical element, such as a mirror, a lens or an optical fiber. Alternatively, the scanning beam may be provided by a rotatable or pivotable source of radiation. In a further alternative, the scanning beam may be generated by a curing unit comprising a plurality of individually controllable radiation emitting units.

In a further embodiment, at least part of the curing unit being configured to in printing operation move in reciprocation in a scanning direction.

The entire curing unit may move in reciprocation in the scanning direction. Alternatively, only a part of the curing unit may move in reciprocation in the scanning direction. For example, if the curing unit comprises a stationary lamp and a movable optical element, such as a lens, a mirror or an optical fiber, then the optical element may move in reciprocation in the scanning direction, whereas the stationary lamp may not move in reciprocation in the scanning direction.

The movement of the scanning curing unit and the print unit may move at the same speed. Preferably, the distance between the print unit and the scanning part of the curing unit may be constant.

In an embodiment, the curing unit is configured to partially cure the ink and the method further comprises a second irradiating step for further curing the ink.

The curing unit may provide a dose of radiation to the ink applied onto the recording medium that may be insufficient to fully cure the ink. The ink may be partially cured. Partial curing is also known as pinning. Ink that is pinned, but not fully cured, may be stabilized to limit the spreading of the droplet.

After being pinned, the ink may be fully cured. This may be done in a second irradiating step. The second irradiating step may preferably be performed when all ink has been applied in an area of the recording medium. The second irradiating step may be performed using a further curing unit. The further curing unit may be positioned downstream, in a medium transport direction, with respect to the print unit.

Alternatively, the radiation for the partial curing of the ink and the second radiation step may be provided by the same source of radiation and this radiation may be split using optical means, such as a lens, a mirror, an optical fiber or a combination of these optical means.

In an embodiment, the scanning curing unit is mounted on a print head carriage, the print head carriage being configured to carry the at least one scanning print unit. The print head carriage may be a structure configured to carry one or more print units. A print unit may comprise a print head, such as an inkjet print head. Optionally, a print unit may comprise a plurality of print units, such as a group of print units configured to in operation eject different colors. Alternatively, the group of print units may be configured to in operation apply one single color of ink onto the recording medium. The print head carriage may be moveable in reciprocation in the main scanning direction.

Optionally, the print head carry may carry at least a part of the curing unit. In case the print head carriage carries at least part of the curing unit, the at least part of the curing unit may move in reciprocation in the main scanning direction.

In a further embodiment, the scanning curing unit comprises two sources of radiation, wherein a first source of radiation is positioned downstream of the at least one scanning print unit, in the main scanning direction, and the second source of radiation is positioned upstream of the least at least one scanning print unit, in the main scanning direction.

One of the first and second sources of radiation is preceding the print unit and one source of radiation and the other one of the first and second sources of radiation is following the print unit when the carriage moves in the main scanning direction, both in the forward movement in the main scanning direction as well as in the backward movement in the main scanning direction. Hence, radiation can be provided to the ink shortly after being deposited onto the recording medium during each scanning movement of the print head carriage. At least one of the first and second source of radiation may have an output controlled according to a predetermined output profile.

In a further embodiment, the first source of radiation and the second source of radiation are operated alternately.

One of the first source and second source of radiation may be switched off and the other one of the first and second source of radiation may be operated to have an output controlled according to a predetermined output profile. For example, when the print carriage turns, the source of radiation that was switched off may start operating to have an output controlled according to a predetermined output profile. At the same time, the source of radiation that was operated to have an output controlled according to a predetermined output profile may be switched off. By operating the sources of radiation alternately, the time between applying the ink onto the recording medium and irradiating the ink may be constant, even in case of bidirectional printing.

In an embodiment, the curing unit comprises a page-wide radiation emitting unit, wherein the page-wide radiation emitting unit extends in a first direction, the first direction being substantially perpendicular to a direction of relative recording medium transport, the page wide curing array comprising a number of individually controllable units, the individually controllable units being adjacent to one another in the first direction, the individually controllable units being configured to in operation emit radiation onto an area of the recording medium.

The page-wide array may extend in a first direction, the first direction being substantially perpendicular to a direction of relative recording medium transport. The recording medium may move with respect to the printing unit. The relative movement may be effected by moving at least one of the recording medium and print unit. The direction of relative movement of the print unit and the recording medium is the relative recording medium transport direction. The first direction is substantially perpendicular to the relative recording medium transport direction. The page wide curing array comprising a number of individually controllable units. The radiation emitting units may be single radiation emitting units, such as lamps or LEDs. Alternatively, the radiation emitting units may comprise a plurality of lamps or LEDs or a combination thereof. Non-limiting examples of lamps are UV arc lamps, mercury vapor lamps and metal halide bulbs. Preferably, the radiation emitting units comprise at least one LED. The radiation emitting units are arranged along a direction perpendicular to a direction of medium transport. The length of the page-wide curing array in the direction perpendicular to the medium transport direction may be selected such that the entire width of a recording medium can be irradiated with radiation emitted by the page-wide array. For example, the length of the page-wide curing array in the direction perpendicular to the medium transport direction may be about the same as the maximum width of a recording medium that can be supported by the medium support. The radiation emitting unit may be configured to in operation irradiate a certain area of the recording medium. By controlling the individual radiation emitting units, the radiation received by a certain area of the recording medium during a certain period of time may be controlled.

The radiation emitting units may be individually controllable. The radiation emitting units may be controlled e.g. by controlling the amount of power supplied to the individual radiation emitting units The radiation emitting units may be controlled such that at a first moment in time a first radiation emitting element is emitting radiation and a second radiation emitting element adjacent to the first radiation element is not. At a second moment in time the first radiation emitting element may not be emitting radiation and a second radiation emitting element adjacent to the first radiation element may emit radiation. This way, a beam of radiation may be created that travels along the scanning direction. The intensities of the individually controllable radiation emitting units may be controlled in accordance with the present invention.

In an embodiment, the curing unit further comprises a mirror for reflecting the radiation emitted onto the recording medium. The mirror may reflect the radiation and optionally change direction of the radiation emitted onto the recording medium. The use of a mirror may allow more options in positioning the radiation source with respect to the print unit. Optionally, the curing unit may comprise a plurality of mirrors for reflecting the radiation emitted by the page-wide curing array onto the recording medium.

In an aspect of the invention, a scanning printer is provided, the scanning printer comprising:

- at least one scanning print unit configured to in printing operation move in reciprocation in a scanning direction;
- a curing unit, the curing unit being configured to in operation provide a beam of radiation for irradiating the ink;
- a medium support for supporting a recording medium;
- a control unit configured to control the printer to perform a method according to the present invention.

The printing apparatus is thus configured to perform the method according to the present invention.

In a further aspect of the invention, a software product is provided, the software product comprising program code on a non-transitory machine-readable medium, wherein the program code, when loaded into a controller of a scanning printer with at least one scanning print unit, a medium support and a curing unit, causes the controller to perform a method according to the present invention.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIG. 3 is a schematic top view of a third example of a printing system according to the present invention in a third printing mode;

FIG. 4 is a schematic diagram of a control unit of a reprographic system according to FIG. 1, 2 or 3;

In the drawings, same reference numerals refer to same elements.

DETAILED DESCRIPTION OF THE PREFERRED EMBODIMENTS

Figure 1:
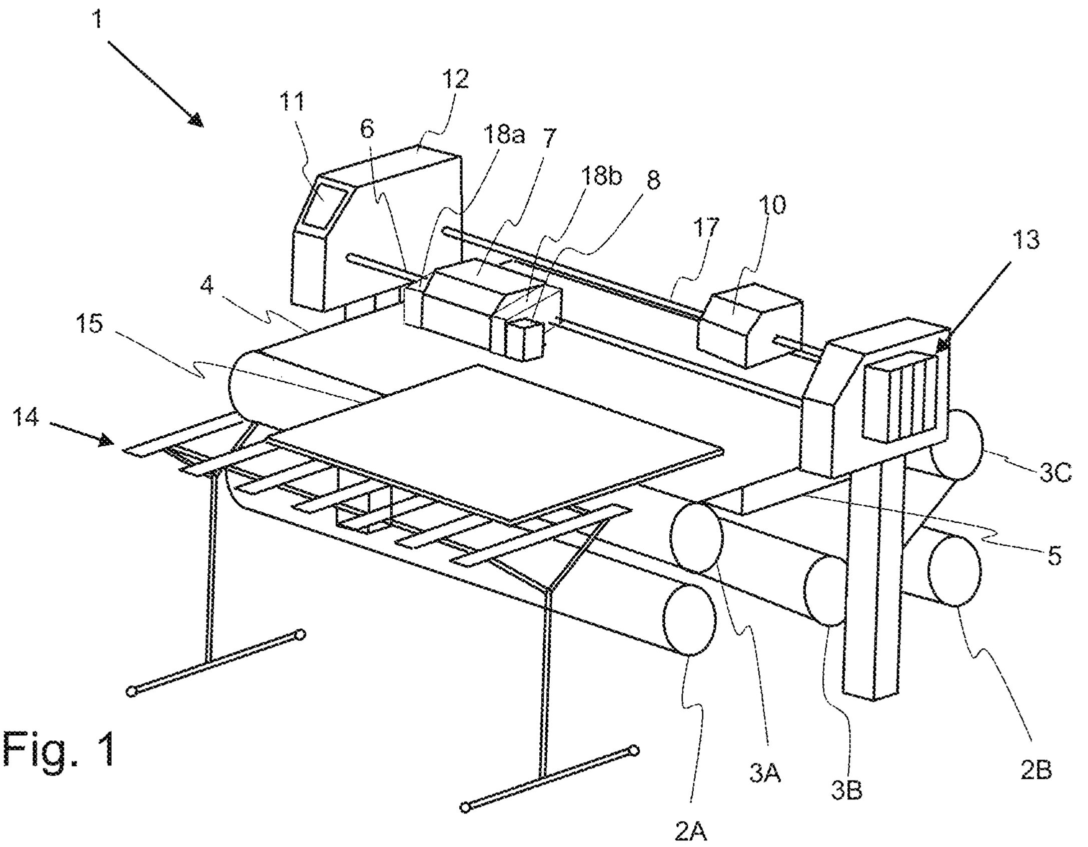
FIG. 1 is a schematic perspective view of a first example of a printing system according to the present invention in a first printing mode.

The present invention will now be described with reference to the accompanying drawings, wherein the same reference numerals have been used to identify the same or similar elements throughout the several views.

Printing System

FIG. 1 shows a wide format inkjet printer 1. The printer 1 is a printing apparatus. The wide-format printer 1 comprises an inkjet printing assembly 7 for printing on a recording medium 15. The inkjet printing assembly is a print head carriage. The recording medium 15 in FIG. 1 is a relatively rigid substrate, such as a panel. The recording medium 15 is supplied from a media input unit 14, which may be configured for storing a plurality of such print media 15 and supplying these to the printer 1. The printer 1 comprises a medium support 4. Printer 1 may further comprise transport means for receiving and transporting the recording medium 15 along the inkjet printing assembly 7. In FIG. 1, the medium support is embodied as an endless belt 4. The endless belt is an endless transport belt 4 supported on a plurality of support rollers 3A, 3B, 3C. At least one of the support rollers 3A, 3B, 3C is provided with driving means for moving the belt 4. The belt 4 is therefore configured to support and transport the recording medium. Additionally, one or more one of the support rollers 3A, 3B, 3C may be configured to be moved and/or tilted to adjust and control the lateral position of the belt 4. The inkjet printing assembly 7 may be provided with a sensor 8, such as a CCD camera, to determine the relative position of belt 4 and/or the recording medium 15. Data from said sensor 8 may be applied to control the position of the belt 4 and/or the recording medium 15. The belt 4 is further provided with through-holes and a suction box 5 in connection with a suction source (not shown), such that an underpressure may be applied to the recording medium 15 via the through-holes in the belt 4. The underpressure adheres the recording medium 15 flatly to the belt 4 and prevents displacement of the recording medium 15 with respect to the belt 4. Due to this holding the belt 4 is able to transport the recording medium 15. It will be appreciated that other suitable transport means, such as rollers, steppers, etc, may alternatively be applied. The recording medium 15 may be transported stepwise and/or in continuous movement.

The inkjet printing assembly 7 is configured to translate along a first guide beam 6 in a scanning direction. The scanning direction is perpendicular to the direction in which the print medium is transported by the belt 4. The inkjet printing assembly 7 holds a plurality of print heads (not shown), which are configured to jet a plurality of different marking materials (different colors of ink, primers, coatings, etc.) on the recording medium 15. Each marking material for use in the printing assembly 7 is stored in one of a plurality of containers arranged in fluid connection with the respective print heads for supplying marking material to said print heads to print an image on the recording medium 15. The ejection of the marking material from the print heads is performed in accordance with data provided in the respective print job. The timing by which the droplets of marking material are released from the print heads determines their position on the recording medium 15. The timing may be adjusted based on the position of the inkjet printing assembly 7 along the first guide beam 6. The above mentioned sensor 8 may therein be applied to determine the relative position and/or velocity of the inkjet printing assembly 7 with respect to the recording medium 15. Based upon data from the sensor 8, the release timing of the marking material may be adjusted.

Upon ejection of the marking material, some marking material may be spilled and stay on a nozzle surface of the print heads. The marking material present on the nozzle surface, may negatively influence the ejection of droplets and the placement of these droplets on the recording medium 15. Therefore, it may be advantageous to remove excess of marking material from the nozzle surface. The excess of marking material may be removed for example by wiping with a wiper and/or by application of a suitable anti-wetting property of the surface, e.g. provided by a coating.

When the marking material has been applied onto the recording medium, the marking material may be partially cured. Partial curing is also known as pinning. Partial curing may be performed using to a curing unit 18. The curing unit 18 as shown in FIG. 1 comprises two UV lamps 18*a*, 18*b*. The two UV lamps 18*a*, 18*b* are positioned on the print head carriage. The first UV lamp 18*a* is positioned at one side edge of the print head carriage, whereas the second UV lamp 18*b* is positioned at the other side edge of the print head carriage.

The marking materials may require treatment to further fixate them on the print medium. Thereto, a fixation unit 10 is provided downstream of the inkjet printing assembly 7. The fixation unit 10 may emit heat and/or radiation to facilitate the marking material fixation process. In the example of FIG. 1, the fixation unit 10 is a radiation emitter, which emits light of certain frequencies, which interacts with the marking materials, for example UV light in case of UV-curable inks. The fixation unit 10 in FIG. 1 is a scanning curing unit. The scanning curing unit comprises at least one radiation emitting unit (not shown). In operation, the curing unit 10 is moved in reciprocation in the scanning direction along guide rail 17. Further, the inkjet printing assembly 7 may be provided with a further fixation unit on the same carriage which holds the print heads. This further fixation unit can be used to cure and/or harden the marking materials, independent of or interaction with the fixation unit 10.

After printing and fixation, the recording medium 15 is transported to a receiving unit (not shown). The receiving unit may comprise a take-up roller for winding up the recording medium 15, a receiving tray for supporting sheets of recording medium 15, or a rigid media handler, similar to the media input unit 14. Optionally, the receiving unit may comprise processing means for processing the medium 8, 9 after printing, e.g. a post-treatment device such as a coater, a folder, a cutter, or a puncher.

The wide-format printer 1 furthermore comprises a user interface 11 for receiving print jobs and optionally for manipulating print jobs. The local user interface unit 11 is integrated to the print engine and may comprise a display unit and a control panel. Alternatively, the control panel may be integrated in the display unit, for example in the form of a touch-screen control panel. The local user interface unit 11 is connected to a control unit 12 connected to the printer 1. The control unit 12, for example a computer, comprises a processor adapted to issue commands to the printer 1, for example for controlling the print process. The printer 1 may optionally be connected to a network. The connection to the network can be via cable or wireless. The printer 1 may receive printing jobs via the network. Further, optionally, the control unit 12 of the printer 1 may be provided with an input port, such as a USB port, so printing jobs may be sent to the printer 1 via this input port.

Hybrid Printing System

Figure 2:
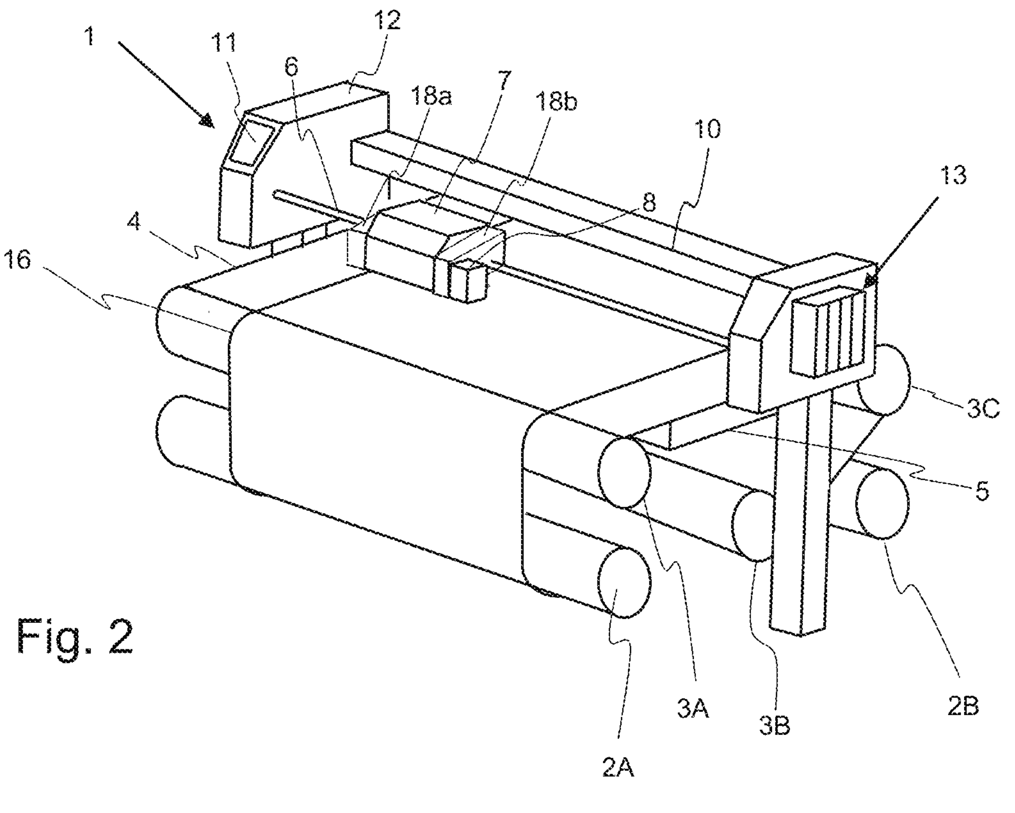
FIG. 2 is a schematic perspective view of a second example of a printing system according to the present invention in a second printing mode.

The printer 1 in FIG. 1 is a so-called hybrid printer, capable of handling both flexible media and rigid substrates. In FIG. 1, the printer 1 operates in a first print mode, wherein the printer 1 is configured for transporting rigid substrates, such as the recording medium 15. Such rigid print media 15 may be panels, for example panels for doors or walls, corrugated media, plates formed of plastic or metal, etc. To handle these rigid print media 15, the printer 1 in FIG. 1 is configured with a substantially linear transport path: from the media input device 14, the recording medium 15 moves forward along the inkjet printing assembly 7 at a at substantially constant height. The media input unit 14 and the receiving unit are positioned at the level of the medium support surface of the belt 4. In FIG. 2, a flexible web medium 16 is supplied to the printer 1, which web medium 16 may be composed of e.g. paper, label stock, coated paper, plastic or textile. The web medium 16 is supplied from the input roller 2A and extends across the belt 4 to the take-up roller 2B, where the web medium 16 is re-wound. The printer 1 is configured to swiftly and efficiently switch between print modes.

Further, the printer 1 shown in FIG. 2 comprises a page-wide curing array 10. The page-wide curing array 10 is a fixation unit. The page-wide curing array 10 extends in the main scanning direction. The page-wide curing array 10 does not move in operation in the main scanning direction. The page-wide array 10 may move in the direction of medium transport, which is a direction perpendicular to the scanning direction.

FIG. 3 shows a schematic top view of a third example of a printing system 1 according to the present invention. The printer 1 comprises a medium support 4. The medium support carries a recording medium 15. The printer further comprises a print unit 7. The print unit 7 is configured to move in reciprocation along guide rail 6. The print unit 7 holds a plurality of print heads 7*a*-7*f*, which are configured to jet a plurality of different marking materials (different colors of ink, primers, coatings, etc.) on the recording medium 15. The print unit 7 further holds a first mirror 28*a* and a second mirror 28*b*. The first mirror 28*a* and the second mirror 28*b* are also referred to as mirrors 28. The mirror 28 are configured to receive radiation emitted by radiation source 29 and reflect the radiation onto the recording medium. The printer 1 further comprises an optical fiber 30. The optical fiber 30 is connected to the radiation source 29 and receives radiation emitted by the radiation source. The optical fiber 30 is connected to guide rail 17 and configured to move in reciprocation along the guide rail. The movement of the optical fiber 30 is adapted to the movement of the print unit 7. The optical fiber 30 may transport the radiation emitted by the radiation source 29 towards the mirrors 28. An end portion of the optical fiber 30 may be aligned with one of the first mirror 28*a* or the second mirror 28*b*.

Control

An embodiment of the control unit 12 is in more detail presented in FIG. 4. As shown in FIG. 4, the control unit 12 comprises a Central Processing Unit (CPU) 31, a Graphical Processor Unit (GPU) 32, a Random Access Memory (RAM) 33, a Read Only Memory (ROM) 34, a network unit 36, an interface unit 37, a hard disk (HD) 35 and an image processing unit 39 such as a Raster Image Processor (RIP). The aforementioned units 31-37 are interconnected through a bus system 38. However, the control unit 12 may also be a distributed control unit.

The CPU 31 controls the printing system 1 in accordance with control programs stored in the ROM 34 or on the HD 35 and the local user interface panel 5. The CPU 31 also controls the image processing unit 39 and the GPU 32. The ROM 34 stores programs and data such as boot program, set-up program, various set-up data or the like, which are to be read out and executed by the CPU 31. The hard disk 35 is an example of a non-volatile storage unit for storing and saving programs and data which make the CPU 31 execute a print process to be described later. The hard disk 35 also comprises an area for saving the data of externally submitted print jobs. The programs and data on the HD 35 are read out onto the RAM 33 by the CPU 31 as needed. The RAM 33 has an area for temporarily storing the programs and data read out from the ROM 34 and HD 35 by the CPU 31, and a work area which is used by the CPU 31 to execute various processes. The interface unit 37 connects the control unit 12 to the client devices, such as scan device 21 and to the printing system 1. The network unit 36 connects the control unit 12 to the network N and is designed to provide communication with the workstations (not shown) and with other devices 21 reachable via the network N. The image processing unit 39 may be implemented as a software component running on an operation system of the control unit 12 or as a firmware program, for example embodied in a field-programmable gate array (FPGA) or an application-specific integrated circuit (ASIC). The image processing unit 39 has functions for reading, interpreting and rasterizing the print job data. Said print job data contains image data to be printed (i.e. fonts and graphics that describe the content of the document to be printed, described in a Page Description Language or the like), image processing attributes and print settings.

FIG. 5A-5F schematically show a method for applying an image onto a recording medium according to a first example of the invention.

Figure 5A:
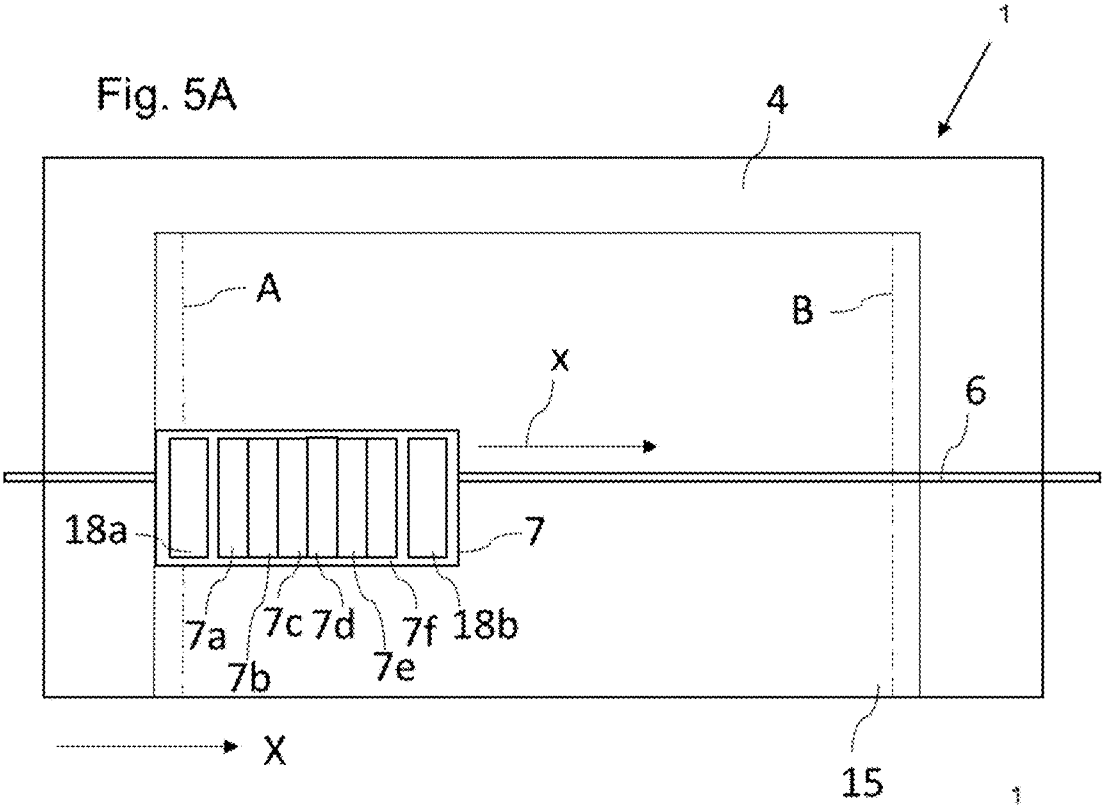
FIG. 5A-5F schematically show a method for applying an image onto a recording medium according to a first example of the invention.
Figure 6A:
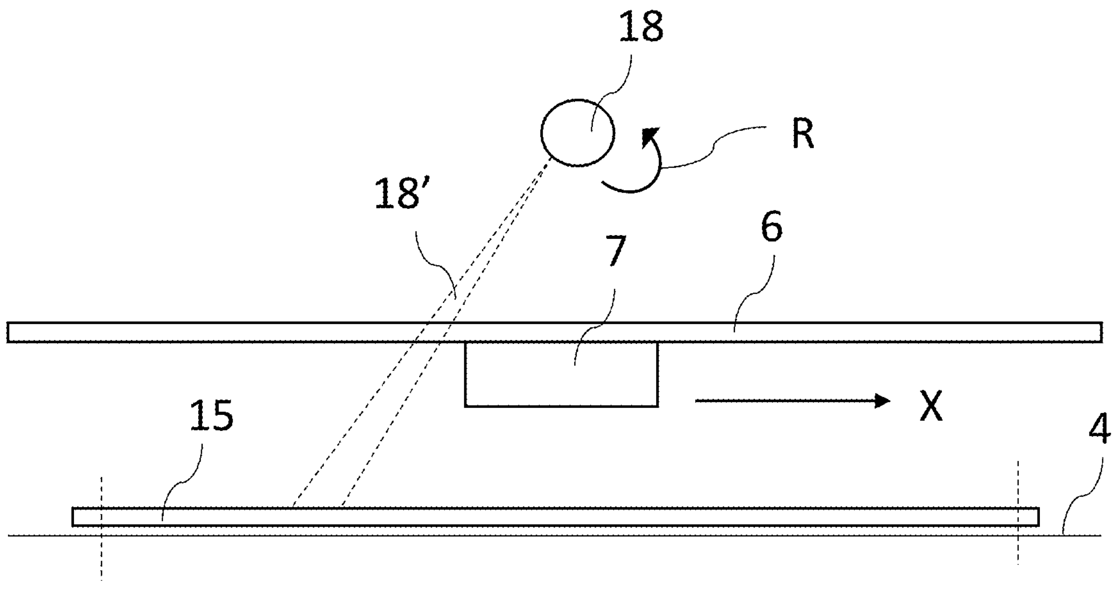
FIG. 6A-6B schematically show a method for applying an image onto a recording medium according to a second example of the invention.

FIG. 5A shows a top view of a printer 1. The printer comprises a medium support 4 carrying a recording medium 15. The printer 1 further comprises a print unit 7 comprising print heads 7*a*-7. The printer 1 further comprises curing unit 18, which comprises two UV lamps 18*a*, 18*b* The print unit 7 and the curing unit 18 move in a forward scanning direction x. During movement of the print unit, one or more print heads 7*a*-7*f* eject ink onto the recording medium 15, thereby forming an image 40 onto the recording medium 15. The formation of the image 40 onto the recording medium start at first side edge A of the recording medium. The ink applied onto the recording medium 15 is irradiated by first UV lamp 18*a*. During print, the output of the first UV lamp 18*a* is controlled to follow an output profile. Examples of output profiled are further explained in FIGS. 9A, 9B and 10A, 10B. At side edge A, the time interval between the first passage and the subsequent (second) passage is relatively long. Hence, the output of the first UV lamp 18*a* is relatively low. As is shown in FIG. 6A, the output of the first UV lamp 18*a*, during the forward scanning movement, when the first UV lamp 18*a* passes first side edge A, is equal to the minimum output.

Figure 5B:
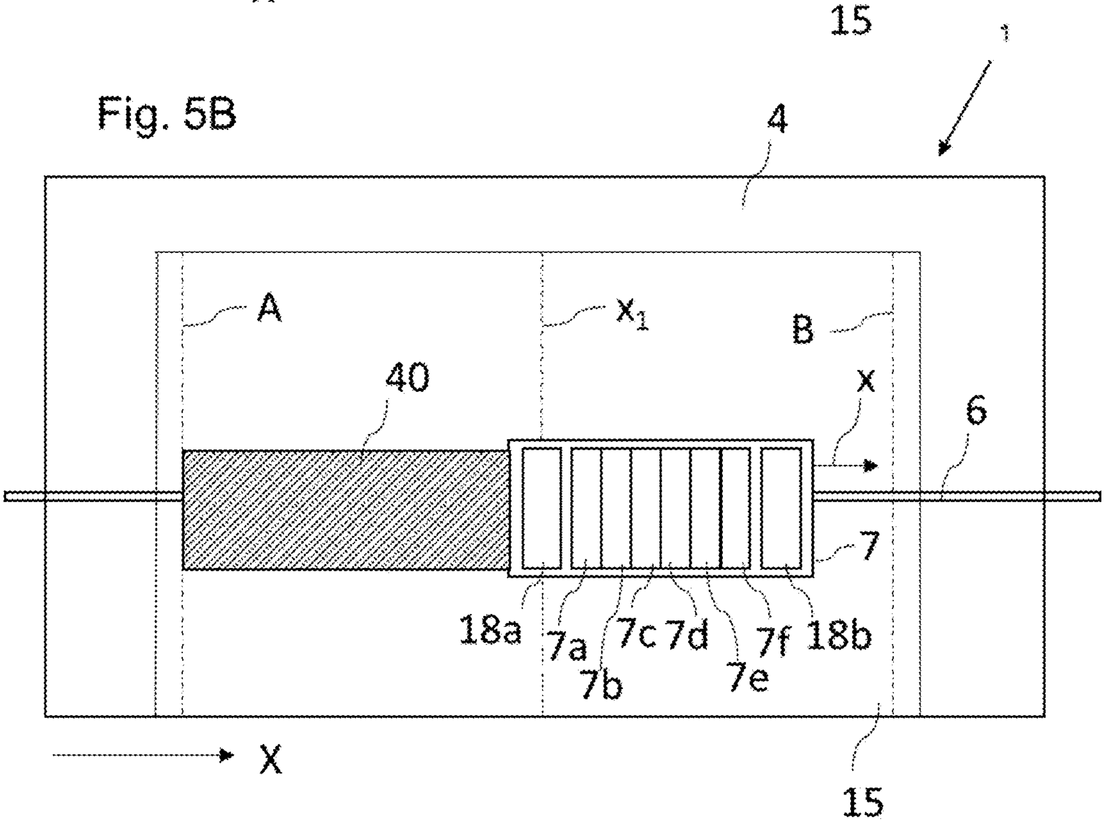

In FIG. 5B, the print unit 7 has advanced further in the forward scanning direction x movement, the image 40 is formed onto the recording medium 15. The first UV lamp 18*a* is now at position $x_1$ in the main scanning direction X.

Figure 5C:
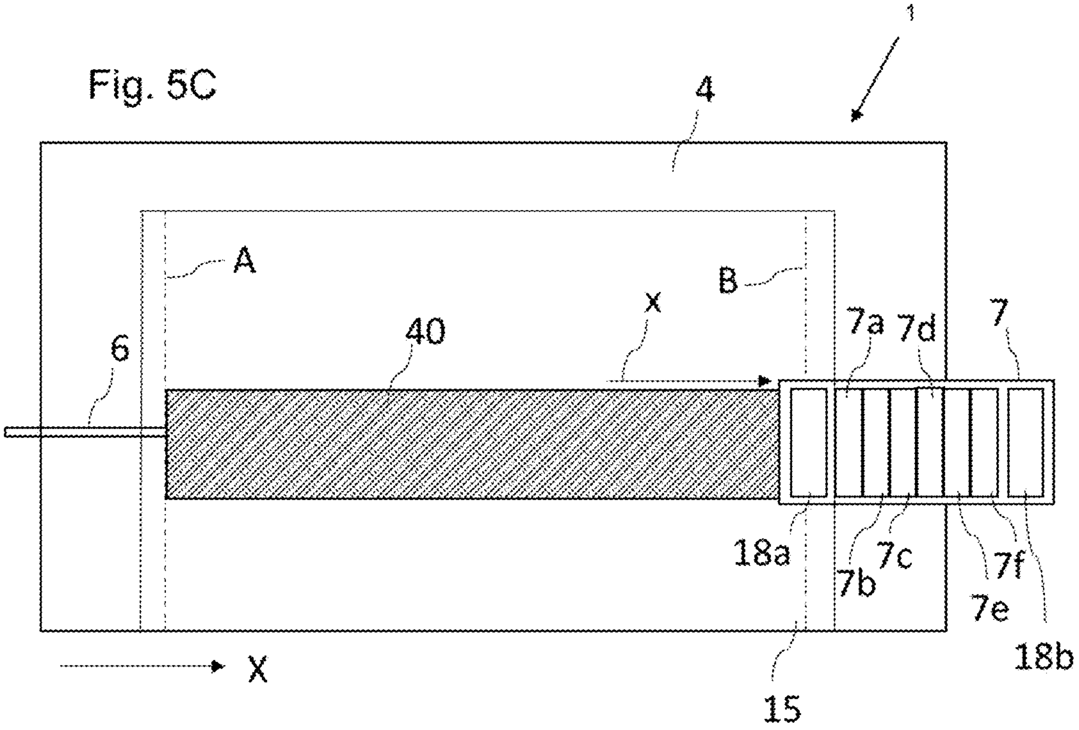

In FIG. 5C, the print unit 7 has advanced even further in the forward scanning direction x movement, the image 40 is formed onto the recording medium 15. In FIG. 5C, the first UV lamp 18*a* has reached the second side edge B of the recording medium.

Figure 5D:
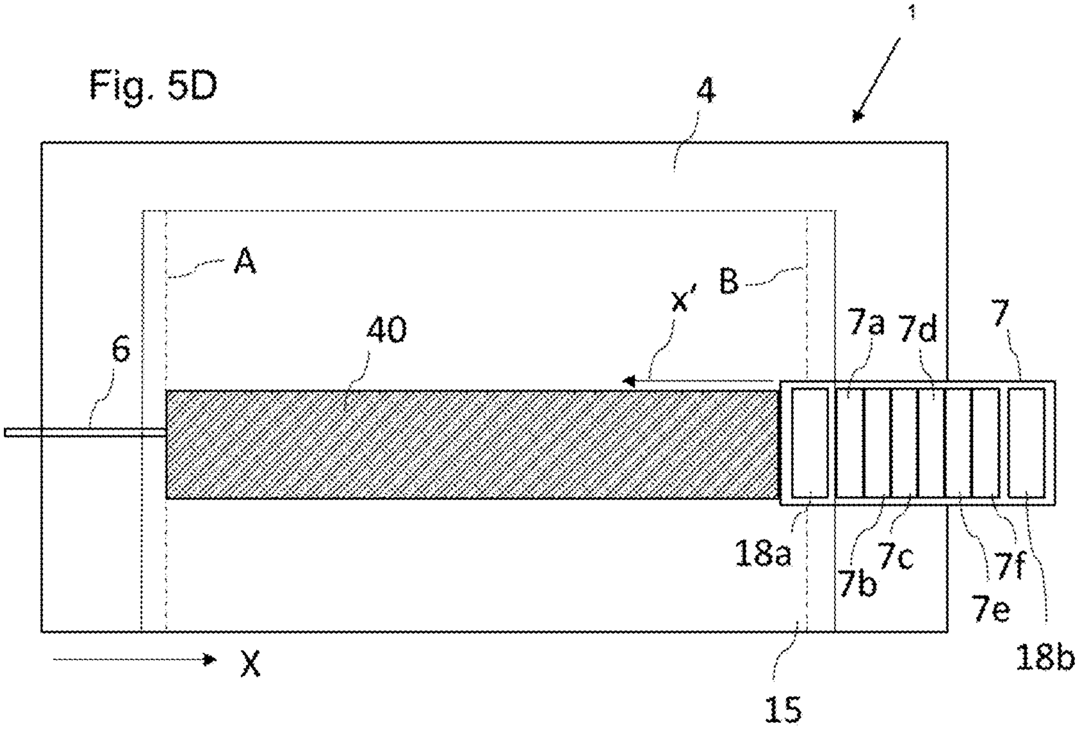
Figure 5E:
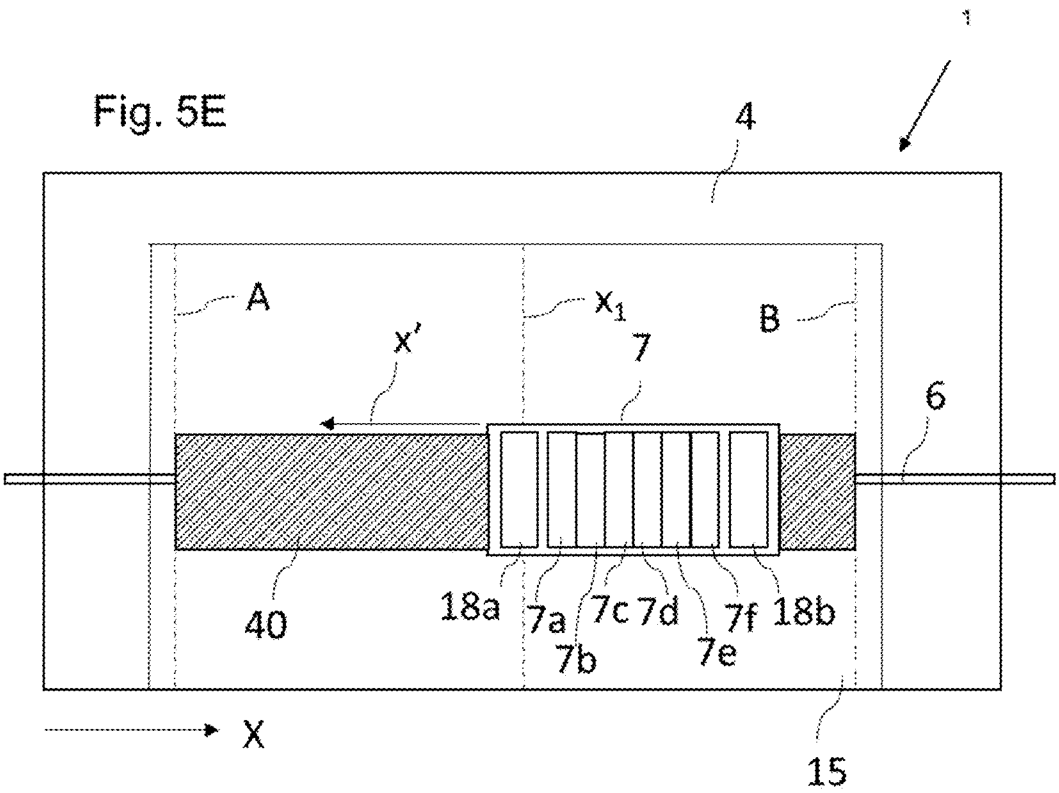
Figure 5F:
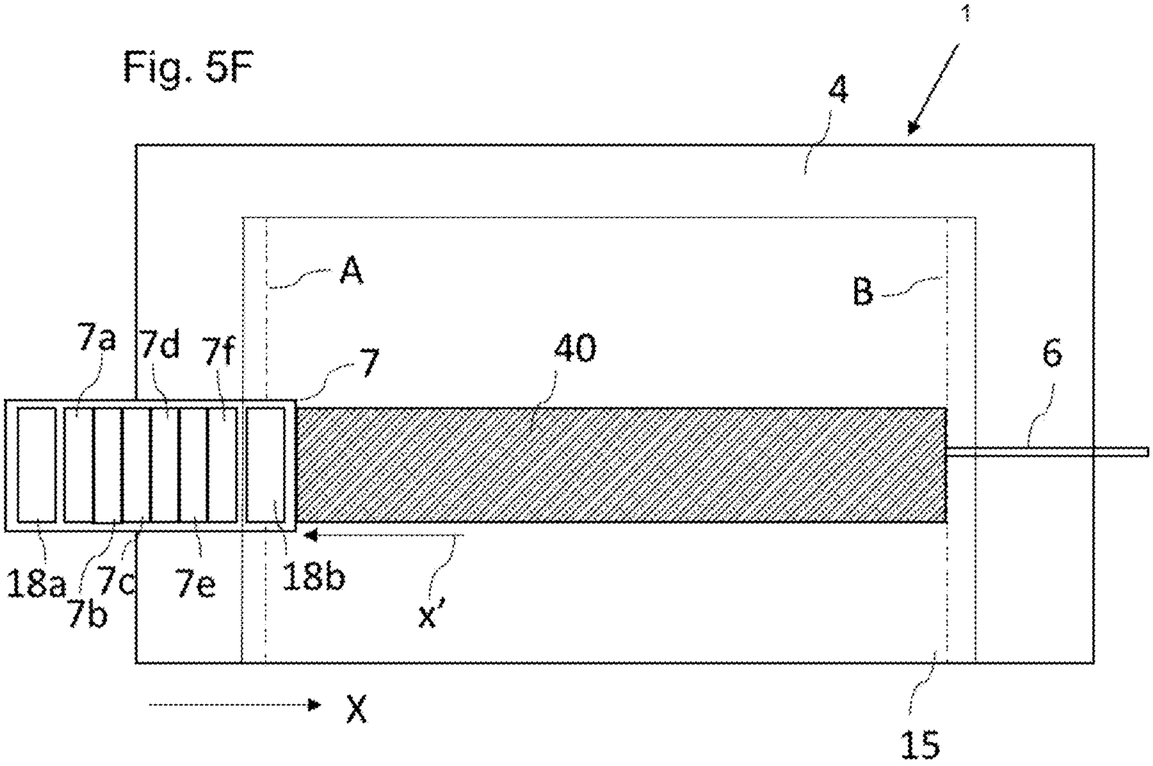

In FIG. 5D-5F, the print unit is moving in the backward scanning direction x'. During movement of the print unit, one or more print heads 7*a*-7*f* eject ink onto the recording medium 15, thereby forming an image 40 onto the recording medium 15. The formation of the image 40 onto the recording medium start at second side edge B of the recording medium. The ink applied onto the recording medium 15 is irradiated by second UV lamp 18*b*. During print, the output of the second UV lamp 18*b* is controlled to follow an output profile.

In FIG. 5D, the print heads 7*a*-*f* have not yet passed the second side edge B of the recording medium. No ink is applied onto the recording medium 15. In FIG. 5E, the print unit 7 is moving in the backward scanning direction x'. At least one of the print heads 7*a*-7*f* is ejecting ink onto the recording medium 15, thereby forming image 40. The second UV lamp 18*b* is now at position $x_1$ in the main scanning direction X and emits radiation according to the predetermined output profile. In FIG. 5F, the print unit 7 has advanced even further in the backward scanning direction x' movement, the image 40 is formed onto the recording medium 15. In FIG. 5F, the second UV lamp 18*b* has reached the first side edge A of the recording medium.

Figure 6B:
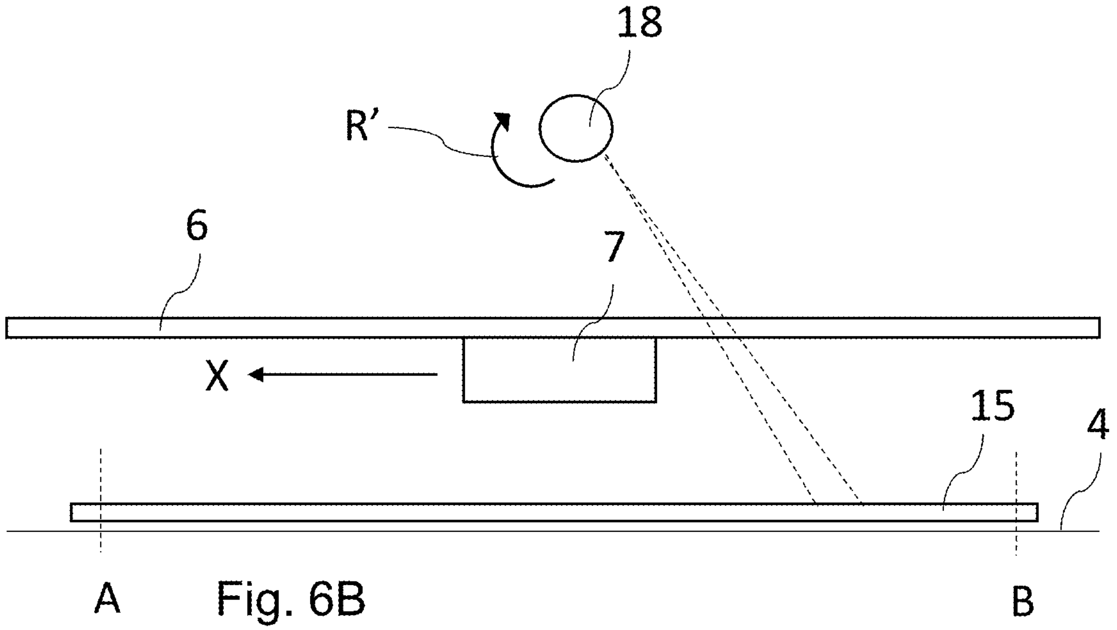

FIG. 6A-6B schematically show a method for applying an image onto a recording medium according to a second example of the invention.

FIG. 6A shows a front view of a printer 1. The printer comprises a medium support 4 carrying a recording medium 15. The printer 1 further comprises a print unit 7 comprising a plurality of print heads (not shown). The print unit 7 move in a forward scanning direction x. During movement of the print unit, one or more print heads (not shown) eject ink onto the recording medium 15, thereby forming an image (not shown) onto the recording medium 15. The formation of the image (not shown) onto the recording medium start at first side edge A of the recording medium.

The printer 1 further comprises curing unit 18, which is a curing unit rotatable in direction R. The curing unit 18 emits a beam of radiation 18' during printing. During printing, when the print unit moves in the forward scanning direction X, the curing unit rotates in direction R. Because of the rotating movement of the curing unit 18, the beam of radiation 18' moves from in the forward scanning direction x, as does the print unit 7. In FIG. 6B, the print unit is moving in the backward scanning direction x'. During movement of the print unit, one or more print heads (not shown) eject ink onto the recording medium 15, thereby forming an image onto the recording medium 15. The formation of the image 40 (not shown) onto the recording medium start at second side edge B of the recording medium. The curing unit is rotated in direction R'. The rotation of the curing unit 18 in direction R' causes the beam of radiation 18' to move in the backward scanning direction x', as does the print unit 7.

Figure 9A:
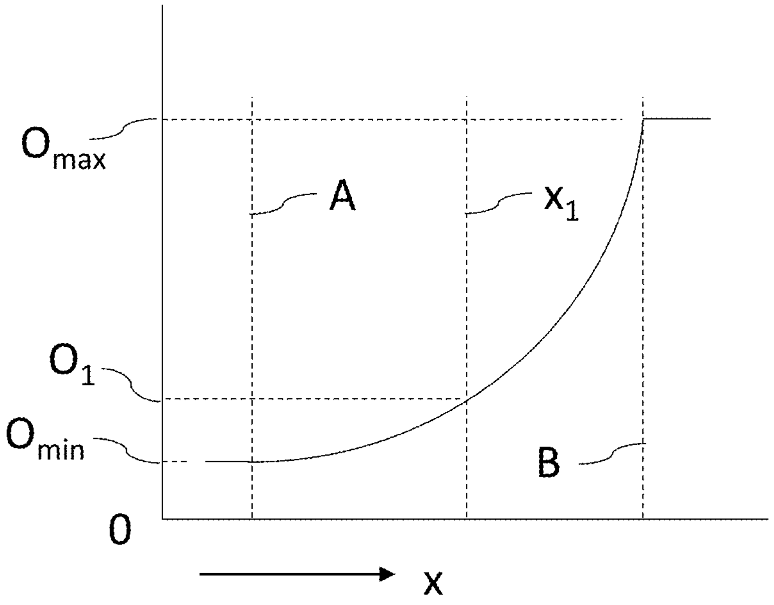
FIGS. 9A and 9B show an example of a radiation output profile according to a first example in accordance with the present invention.

During print, the output of the curing unit 18 is controlled to follow an output profile. Examples of output profiled are further explained in FIGS. 9A, 9B and 10A, 10B. At side edge A, the time interval between the first passage and the subsequent (second) passage is relatively long. Hence, the output of the curing unit is relatively low. As is shown in FIG. 9A, the output of the curing unit 18 during the forward scanning movement, when the print unit 7 passes first side edge A, is equal to the minimum output.

Figure 7A:
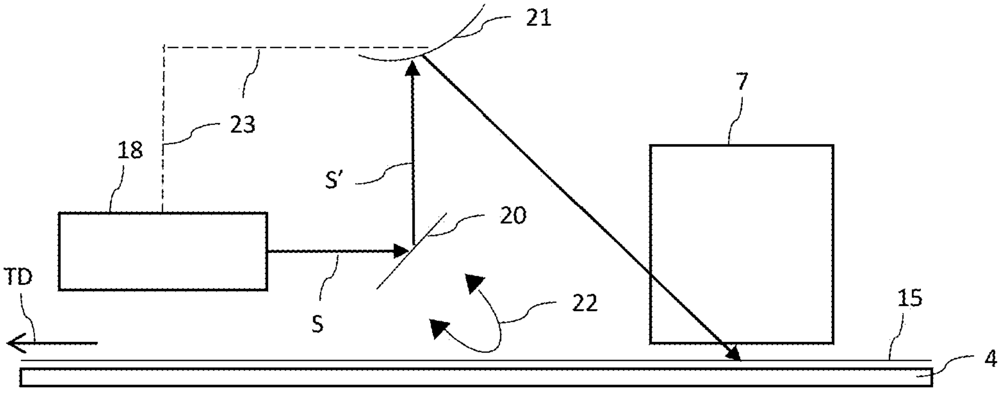
FIG. 7A-7B schematically show a method for applying an image onto a recording medium according to a third example of the invention.
Figure 7B:
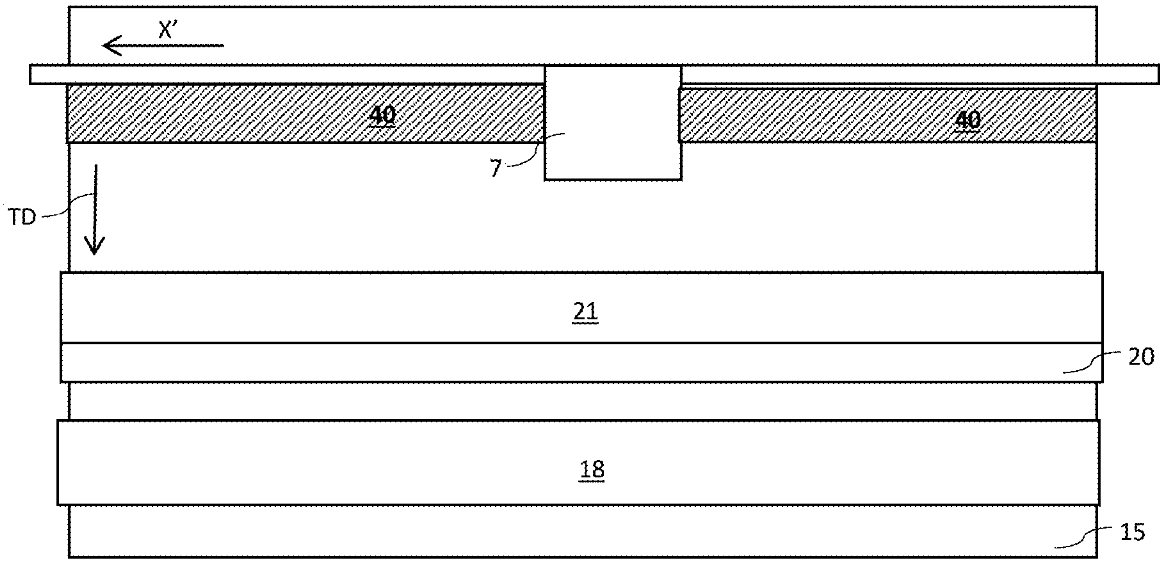

FIG. 7A-7B schematically show a method for applying an image onto a recording medium according to a third example of the invention.

FIG. 7A shows a schematic side view of a third example of the method according to present invention, whereas FIG. 7B shows a schematic top view of a third example of the method according to the present invention. A scanning print unit 7 is provided to move in reciprocation in a scanning direction (x/x'). The scanning print unit is positioned above a recording medium 15. The recording medium 15 is supported by the medium support 4. The recording medium 15 is moved in a medium transport direction (TD), perpendicular to the scanning direction (x/x'). The medium transport direction is also referred to as transport direction or direction of recording medium transport. The scanning print unit 7 during printing applies ink (not shown) onto the recording medium 15, thereby forming an image swath 40. The image swath 40 is the swath that is printed by the scanning print unit 7 in the example shown in FIG. 7B. It is referred to as the current swath. After a swath is finished, the recording medium 15 may move in the transport direction TD and a subsequent swath may be formed. By forming a plurality of swaths, an image may be formed on the recording medium 15.

A page-wide curing array 18 is provided. The page-wide curing array is configured to in operation emit radiation S. The radiation S emitted is directed towards the first mirror element 20. In the example shown in FIG. 7A, the first mirror element 20 is a flat mirror. Alternatively, the first mirror element may have a different shape. The radiation S emitted by the page-wide curing array 10 is reflected by the first mirror element 20. In the example shown in FIG. 7A, the radiation is reflected towards the second mirror element 21, in a direction S'. The radiation reflected towards the second mirror element 21 is reflected by the second mirror element 21 towards an area of the recording medium that is part of a present swath 40. The second mirror element 21 is connected to the page-wide curing array. Alternatively, the second mirror element 21 may be connected to other parts of the printer, such as the frame of the printer. The connection is schematically depicted by dashed lines 23. Optionally, the second mirror element 21 may be movable with respect to the page-wide curing array 18. The page-wide curing unit 18 may in operation emit radiation over the entire width of the recording medium 15. During print, the output of the curing unit 18 is controlled to follow an output profile. Consequently, the output of the curing unit 18 may change in time. Examples of output profiled are further explained in FIGS. 9A, 9B and 10A, 10B. At side edge A, the time interval between the first passage and the subsequent (second) passage is relatively long. Hence, the output of the curing unit is relatively low. As is shown in FIG. 9A, the output of the curing unit 18 during the forward scanning movement, when the print unit 7 passes first side edge A, is equal to the minimum output.

Figure 8A:
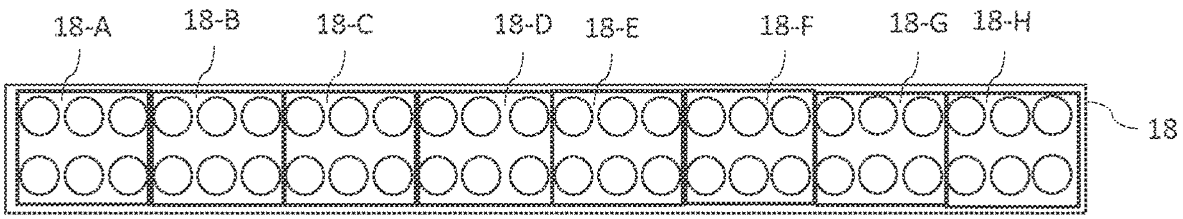
FIG. 8A-8B schematically show a method for applying an image onto a recording medium according to a fourth example of the invention.
Figure 8B:
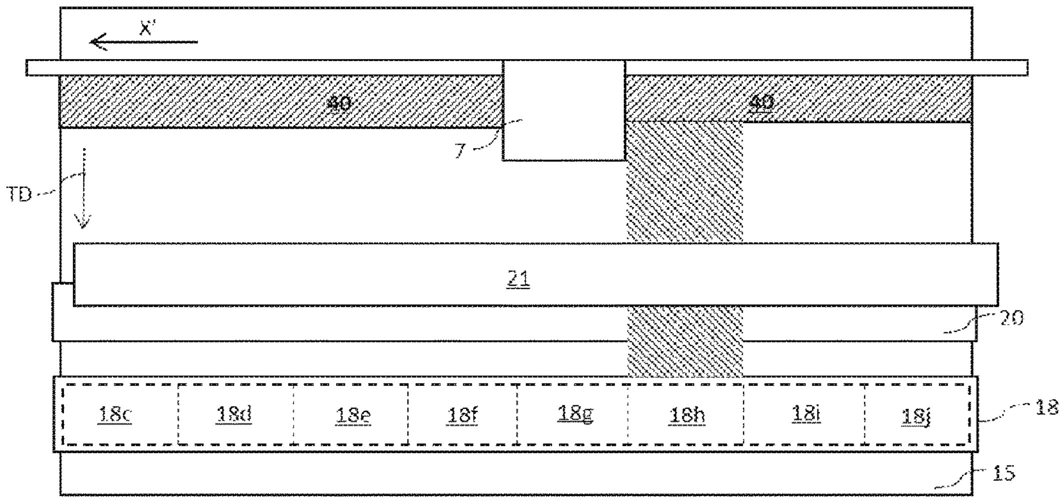

FIG. 8A-8B schematically show a method for applying an image onto a recording medium according to a fourth example of the invention. FIG. 8A shows a perspective view of page-wide curing array 18. The page-wide curing array 18 comprises 8 segments 18*c*-18*j* that are individually controllable. One or more of the segments 18*c*-18*j* may emit radiation, while one or more of the other segments 18*c*-18*j* may not emit radiation. Further, the output of one of the segments 18*c*-18*j* emitting radiation may differ from the output of another one of the segments 18*c*-18*j* emitting radiation. FIG. 8B shows a top view of a printer provided with the curing unit 18 as shown in FIG. 8A. In FIG. 8B, the print unit 7 is moving in the backward scanning direction x'. The segment 18*h* is emitting radiation, whereas the other segments 18*c-g*, 18*i* and 18*j* are not. When the print unit 7 further advances in the backward scanning direction x' (not shown), the segment 18*h* may stop emitting radiation, whereas segment 18*g* may start emitting radiation, etc. The output of an individual segment may differ from the output of a segment upstream or downstream of said individual segment. Examples of output profiled are further explained in FIGS. 9A, 9B and 10A, 10B. At side edge A, the time interval between the first passage and the subsequent (second) passage is relatively long. Hence, the output of the curing unit is relatively low. As is shown in FIG. 9A, the output of the curing unit 18 during the forward scanning movement, when the print unit 7 passes first side edge A, is equal to the minimum output.

Figure 9B:
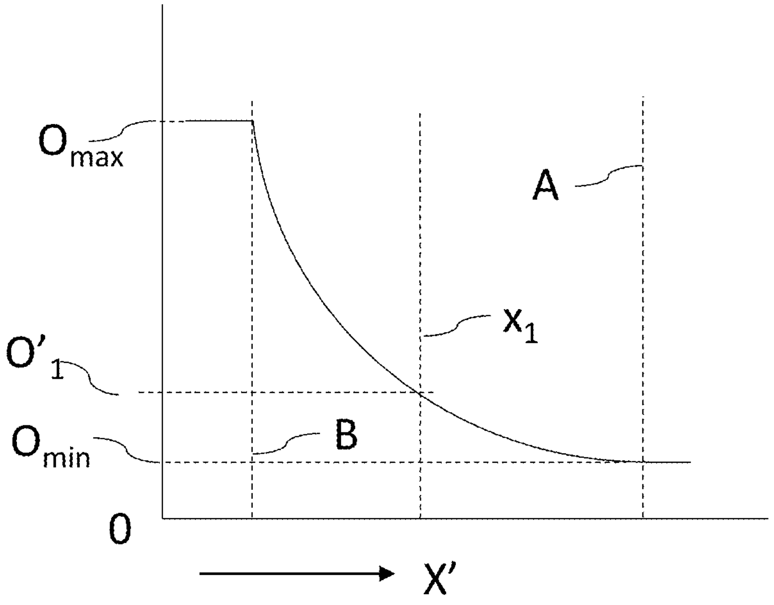

FIGS. 9A and 9B show an example of a radiation output profile according to a first example in accordance with the present invention. FIG. 9A shows an output profile for a curing unit when the print unit moves in the forward scanning direction x. For example, the first UV lamp 18*a* as shown in FIG. 5A-5C may have an output profile as shown in FIG. 9A. Also curing unit 18 as shown in FIG. 6*a*, FIG. 7A and FIG. 8A may have an output profile as shown in FIG. 9A when the print unit moves in forward scanning direction x. The output profile will be further explained with reference to FIG. 5A-FIG. 5C. At the start, the output of the first UV lamp 18*a* is the minimum output ($O_{min}$). This corresponds to the situation shown in FIG. 5A. There, the time interval between the first passage and the second passage is relatively long. When the print unit 7 advances in the forward scanning direction x, the output of the first UV lamp 18*a* gradually increases. When the first UV lamp 18a is at position x, the output is $O_1$. This corresponds to the situation schematically shown in FIG. 5B. Upon further advancing in the forward scanning direction x, the first UV lamp 18a finally reaches the second side edge B of the recording medium, as is schematically depicted in FIG. 5C. When the first UV lamp 18a is at position B, then the output of first UV lamp 18a is the maximum output $O_{max}$. When the first UV lamp 18a is at position B, then the time interval between the first passage of the print unit 7 and the second passage of the print unit 7 is relatively short.

When the print unit 7 has reached the end of the forward scanning movement x, the print unit 7 may turn and start moving in the backward scanning direction x'. This is schematically depicted in FIGS. 5D-5F and the corresponding output profile of the second UV lamp 18b is shown in FIG. 9B.

At the start of the movement in the backward scanning direction x', the output of the second UV lamp 18b is the minimum output ($O_{min}$). This corresponds to the situation shown in FIG. 5D. When the print unit 7 advances in the backward scanning direction x', the output of the second UV lamp 18b gradually increases. When the second UV lamp 18b is at position x, the output is O'1. This corresponds to the situation schematically shown in FIG. 5E. Upon further advancing in the backward scanning direction x', the second UV lamp 18b finally reaches the first side edge A of the recording medium, as is schematically depicted in FIG. 5F. When the second UV lamp 18b is at position A, then the output of second UV lamp 18b is the maximum output $O_{max}$. Please note that also curing unit 18 as shown in FIG. 6B, FIGS. 7A-7B and FIGS. 8A-8B may have an output profile as shown in FIG. 9A when the print unit moves in backward scanning direction x'.

Figure 10A:
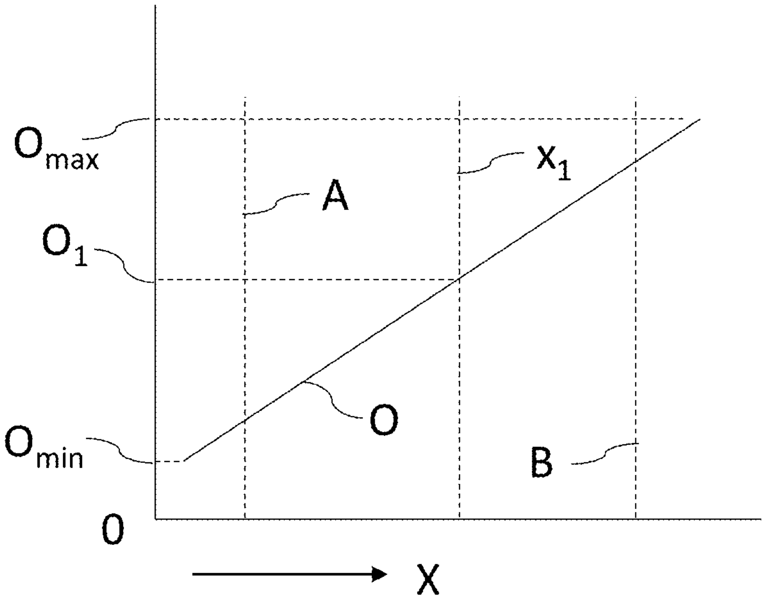
FIGS. 10A and 10B show an example of a radiation output profile according to a second example in accordance with the present invention.
Figure 10B:
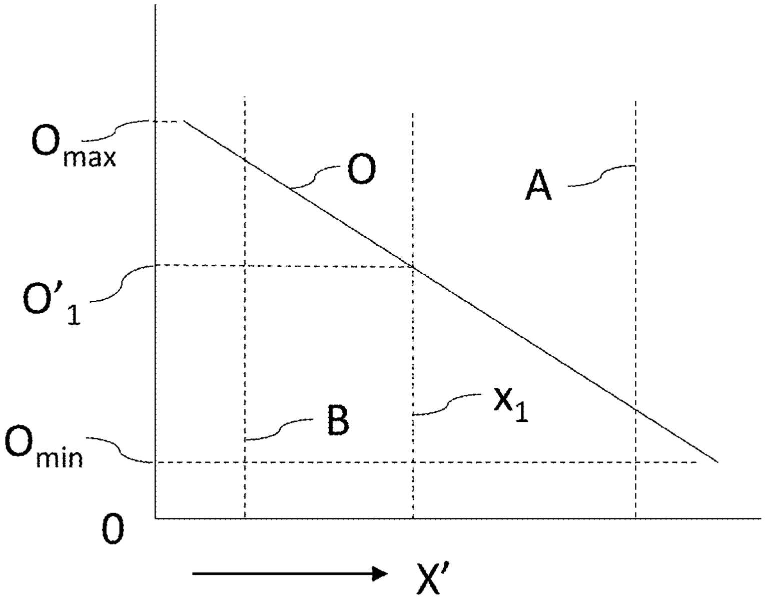

FIGS. 10A and 10B show an example of a radiation output profile according to a second example in accordance with the present invention. FIGS. 10A and 10B will be further explained with reference to FIG. 5D-FIG. 5F, but it is noted that also curing unit 18 as shown in FIGS. 6A-6B, FIGS. 7A-7B and FIGS. 8A-8B may have an output profile as shown in FIG. 10A when the print unit moves in forward scanning direction x, or an output profile as shown in FIG. 10B when the print unit moves in backward scanning direction x'.

FIG. 10A shows an output profile for the first UV lamp 18a during a forward movement in the main scanning direction, as shown in FIG. 5A-5C. At the start, the output of the first UV lamp 18a is the minimum output ($O_{min}$). This corresponds to the situation shown in FIG. 5A. When the print unit 7 advances in the forward scanning direction x, the output of the first UV lamp 18a gradually increases. When the first UV lamp 18a is at position $x_1$, the output is $O_1$. This corresponds to the situation schematically shown in FIG. 5B. Upon further advancing in the forward scanning direction x, the first UV lamp 18a finally reaches the second side edge B of the recording medium, as is schematically depicted in FIG. 5C. When the first UV lamp 18a is at position B, then the output of first UV lamp 18a is the maximum output $O_{max}$.

When the print unit 7 has reached the end of the forward scanning movement x, the print unit 7 may turn and start moving in the backward scanning direction x'. This is schematically depicted in FIGS. 5D-5F and the corresponding output profile of the second UV lamp 18b is shown in FIG. 10B.

At the start of the movement in the backward scanning direction x', the output of the second UV lamp 18b is the minimum output ($O_{min}$). This corresponds to the situation shown in FIG. 5D. When the print unit 7 advances in the backward scanning direction x', the output of the second UV lamp 18b gradually increases. When the second UV lamp 18b is at position x, the output is O'1. This corresponds to the situation schematically shown in FIG. 5E. Upon further advancing in the backward scanning direction x', the second UV lamp 18b finally reaches the first side edge A of the recording medium, as is schematically depicted in FIG. 5F. When the second UV lamp 18b is at position A, then the output of second UV lamp 18b is the maximum output $O_{max}$.

The output profile shown in FIGS. 9A and 9B is a non-linear output profile, in which the intensity increases slowly at the start of a forward or backward movement in the scanning direction and increases faster at the end of a forward or backward movement in the scanning direction. The output profile shown in FIGS. 10A and 10B is a linear output profile, wherein the output increases at a constant rate during a forward or backward scanning movement. These output profiles are examples of the present invention; it is to be understood that alternative output profiles may be used within the scope of the invention.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed. Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention claimed is:

1. A method for applying an image onto a recording medium using a scanning printer, the scanning printer comprising:

at least one scanning print unit configured to, in a printing operation, move in reciprocation in a scanning direction; and a curing unit, the curing unit being configured to, in operation, provide a beam of radiation for irradiating ink, wherein the method comprises the steps of:

applying a predetermined pattern of a radiation-curable ink onto the recording medium; and irradiating the ink applied onto the recording medium using the curing unit, wherein the output of the curing unit is controlled based on a time interval between a first passage of the print unit and a second passage of the print unit, wherein the output is controlled according to a predetermined output profile, and wherein during a single scanning movement, the output is varied from a non-zero minimum output to a maximum output and wherein the output is higher if the time interval is shorter and the output is lower if the time interval is longer.

2. The method according to claim 1, wherein the radiation-curable ink is a radiation-curable phase change ink.

3. The method according to claim 2, wherein the curing unit is configured to partially cure the ink and the method further comprises a second irradiating step for further curing the ink.

4. The method according to claim 1, wherein the curing unit is configured to, in operation provide a scanning beam of radiation.

5. The method according to claim 4, wherein at least part of the curing unit is configured to, in a printing operation, move in reciprocation in a scanning direction.

6. The method according to claim 5, wherein the curing unit is configured to partially cure the ink and the method further comprises a second irradiating step for further curing the ink.

7. The method according to claim 4, wherein the curing unit comprises a page-wide radiation emitting unit, wherein the page-wide radiation emitting unit extends in a first direction, the first direction being substantially perpendicular to a direction of relative recording medium transport, the page wide curing array comprising a number of individually controllable units, the individually controllable units being adjacent to one another in the first direction, the individually controllable units being configured to in operation emit radiation onto an area of the recording medium.

8. The method according to claim 4, wherein the curing unit is configured to partially cure the ink and the method further comprises a second irradiating step for further curing the ink.

9. The method according to claim 1, wherein the curing unit is configured to partially cure the ink and the method further comprises a second irradiating step for further curing the ink.

10. The method according to claim 1, wherein the curing unit is mounted on a print head carriage, the print head carriage being configured to carry the at least one scanning print unit.

11. The method according to claim 10, wherein the scanning curing unit comprises two sources of radiation, wherein a first source of radiation is positioned downstream of the least at least one scanning print unit, in a main scanning direction, and the second source of radiation is positioned upstream of the least at least one scanning print unit, in the main scanning direction.

12. The method according to claim 11, wherein the first source of radiation and the second source of radiation are operated alternately.

13. The method according to claim 1, wherein the curing unit further comprises a mirror for reflecting the radiation emitted onto the recording medium.

14. A scanning printer comprising:

at least one scanning print unit configured to, in a printing operation, move in reciprocation in a scanning direction;

a curing unit, the curing unit being configured to, in operation, provide a beam of radiation for irradiating the ink;

a medium support for supporting a recording medium; and a control unit configured to control the printer to perform the method according to claim 1.

15. A software product comprising program code on a non-transitory machine-readable medium, wherein the program code, when loaded into a controller of a scanning printer with at least one scanning print unit, a medium support and a curing unit, causes the controller to perform the method according to claim 1.

* * * * *